Dec. 11, 1962   E. D. FINLEY ETAL   3,067,911
ARTICLE HANDLING APPARATUS
Filed Dec. 26, 1957   4 Sheets-Sheet 1
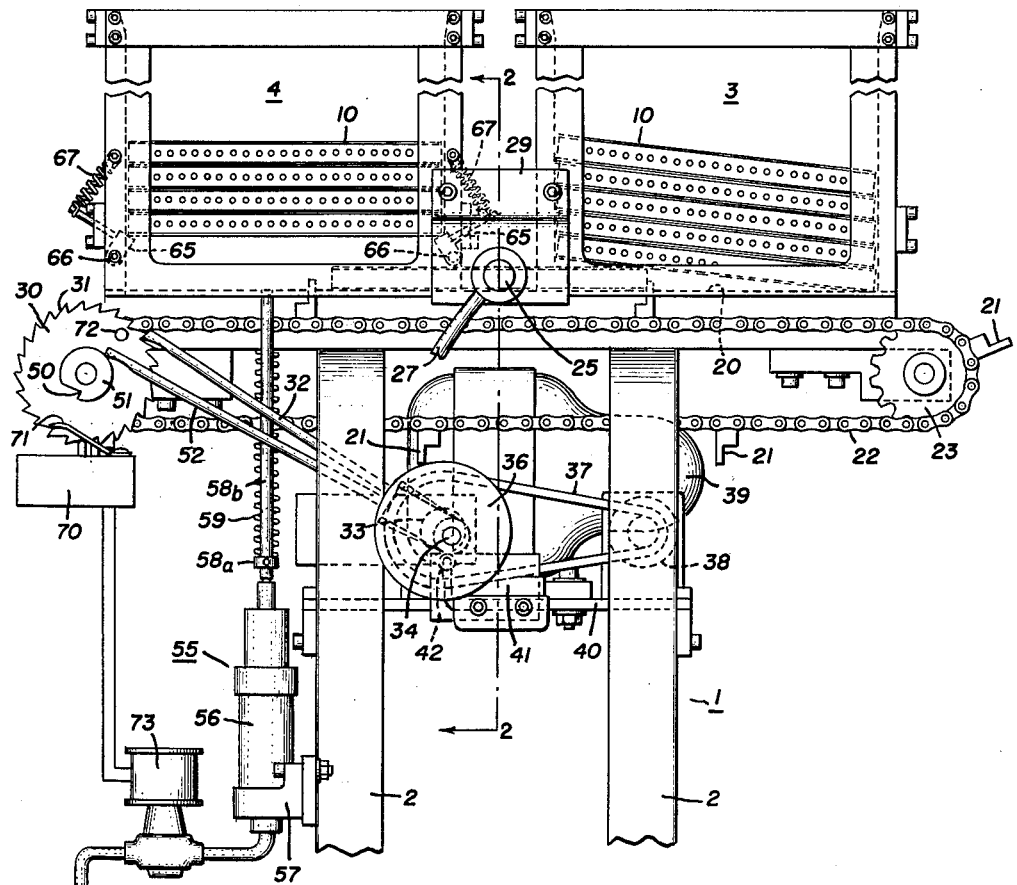
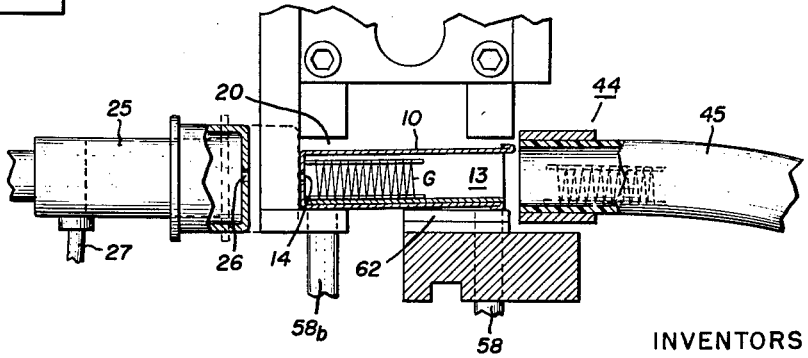
INVENTORS:
ROBERT T. PENNOYER,
EDWIN D. FINLEY,
BY Nathan Hornfeld
THEIR ATTORNEY.

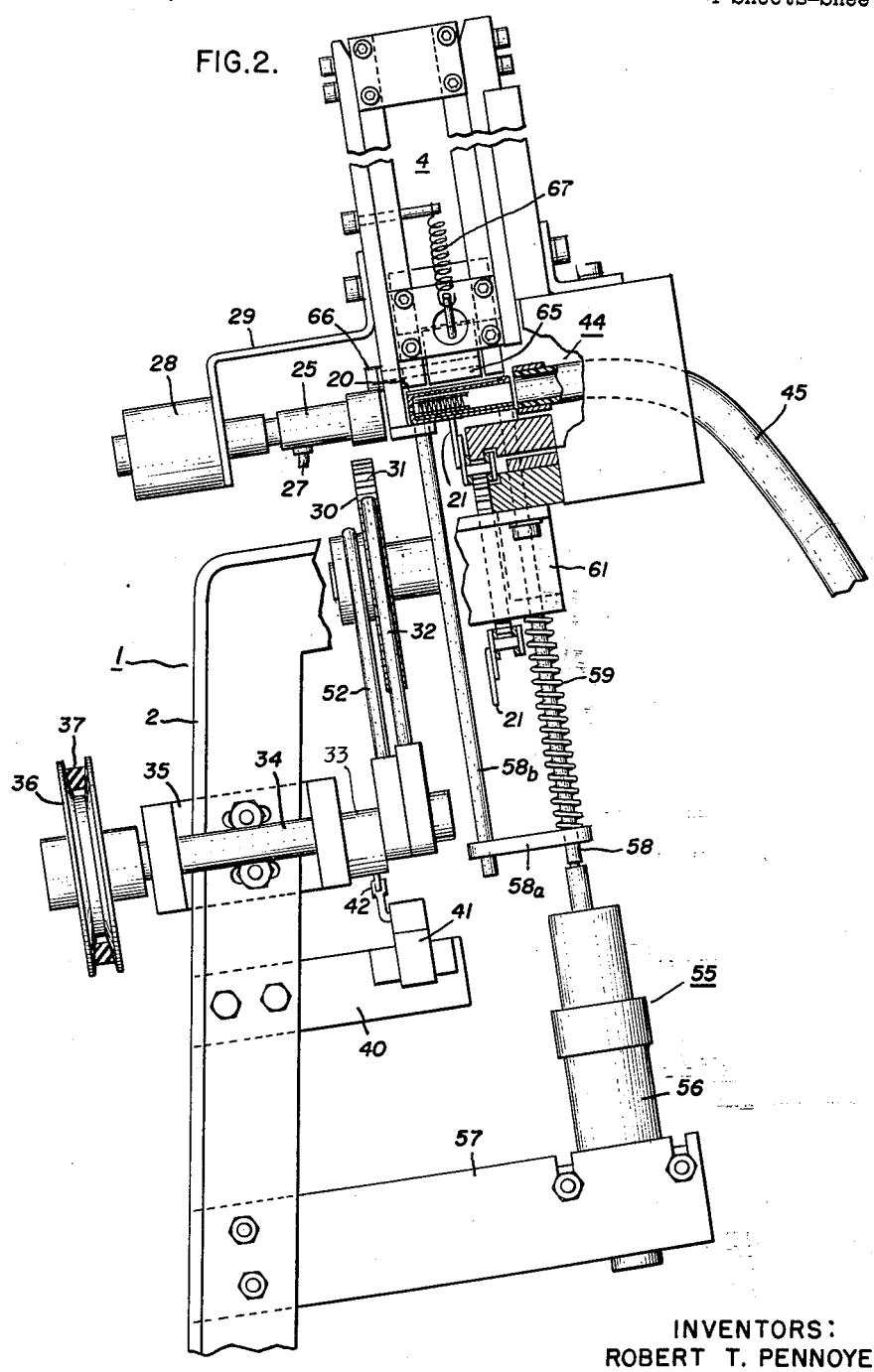

Dec. 11, 1962   E. D. FINLEY ETAL   3,067,911
ARTICLE HANDLING APPARATUS
Filed Dec. 26, 1957   4 Sheets-Sheet 3

INVENTORS:
ROBERT T. PENNOYER,
EDWIN D. FINLEY,
BY *Nathan Komfred*
THEIR ATTORNEY.

Dec. 11, 1962  E. D. FINLEY ETAL  3,067,911
ARTICLE HANDLING APPARATUS
Filed Dec. 26, 1957  4 Sheets-Sheet 4

INVENTORS:
ROBERT T. PENNOYER,
EDWIN D. FINLEY,
BY *Nathan Hornfeld*
THEIR ATTORNEY.

United States Patent Office 3,067,911
Patented Dec. 11, 1962

3,067,911
ARTICLE HANDLING APPARATUS
Edwin D. Finley, Schenectady, and Robert T. Pennoyer, Altmont, N.Y., assignors to General Electric Company, a corporation of New York
Filed Dec. 26, 1957, Ser. No. 705,378
5 Claims. (Cl. 221—81)

Our invention relates generally to article handling apparatus and pertains more particularly to apparatus for handling small, fragile work pieces such as electron tube grids.

An object of the present invention is to facilitate the handling of fragile work pieces.

Another object of the present invention is to provide simple and compact apparatus adapted for receiving and holding a substantial supply of fragile articles such as electron tube grids and dispensing same seriatim for transport to automatic tube assemblying apparatus or the like.

Another object of the present invention is to provide apparatus effective for reducing substantially loading and handling time between a grid winding operation and a grid assembling station.

Another object of the present invention is to provide article handling apparatus adapted for affording storage of a greater number of articles in the immediate vicinity of an assembly station and in a small space, thus to minimize substantially the loading deliveries and operations of a storekeeper.

Another object of the present invention is to provide container filling or loading apparatus.

Another object of the present invention is to minimize individual handling of fragile articles thus to minimize the chances of damage thereto from handling.

Further objects and advantages of our invention will become apparent as the following description proceeds and the features of novelty which characterize our invention will be pointed out in the claims annexed to and forming part of this specification.

In carrying out the objects of our invention we provide a plurality of trays each constructed to include a plurality of individual cells completely opened at one end and partially opened at the other. A magazine receives a stack of the trays with the cells. The trays are advanced laterally from the bottom of the stack and actuated so that each cell is indexed to register the partially opened end thereof seriatim at an operating station. At the operating station articles previously loaded in the containers can be removed from the respective cells into transport means, which registers with the completely opened side of each cell positioned at the operating station, by either an air stream or magnetic means. Alternatively, the cells can be loaded at the operating station by gravity, vacuum, or air pressure means. During the indexing operation the trays are each advanced toward the bottom of another magazine wherein the empty trays are stacked for storage until refilled.

For a better understanding of our invention reference may be had to the accompanying drawing in which:

FIGURE 1 is an elevational view of article handling apparatus constructed in accordance with the present invention;

FIGURE 2 is a sectional view taken along the lines 2—2 in FIGURE 1 and looking in the direction of the arrows;

FIGURE 3 is an enlarged fragmentary sectional view illustrating the operation of one form of air ejecting means;

Figure 4:
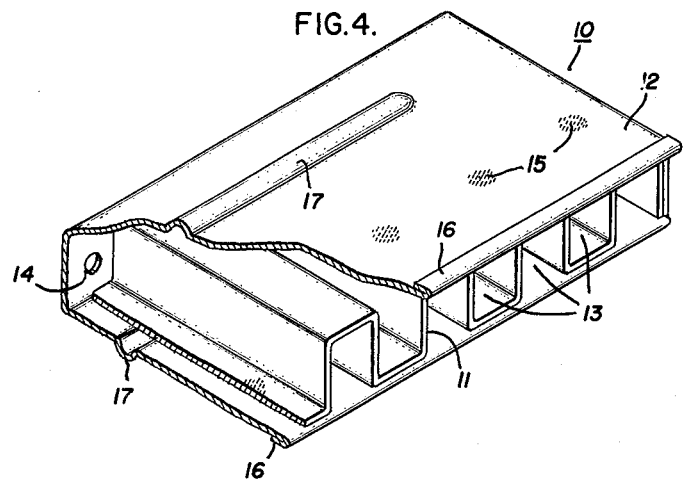
FIGURE 4 is an enlarged fragmentary perspective view illustrating one form of construction of the trays.

In FIGURES 1 and 2 there is shown a frame generally designated 1. For a purpose which will be brought out in detail hereinafter and as illustrated in FIGURE 2, the frame 1 is tilted approximately 10° from the vertical. The frame 1 includes a pair of standards 2 across the top of which is suitably supported a pair of magazines generally designated 3 and 4. The magazines 3 and 4 are in side by side relation with a space interposed and are each constructed to receive a vertical stack of trays generally designated 10.

As illustrated in FIGURE 4, the trays 10 each comprise a honeycomb arrangement formed by alternately bending a sheet of material generally designated 11. This honeycomb arrangement is positioned in an envelope 12 formed by bending or folding a sheet of metal into a U-shaped configuration. The forward end of the tray and, therefore, a plurality of individual cells 13 formed by the honeycomb elements, are opened at the forward edge of the tray. The rear wall of the tray is apertured as at 14 in a position corresponding to each of the cells 13, whereby the rear end of each cell is partially opened and an air passage is provided through each cell.

A plurality of spot welds 15 are provided to secure the honeycomb element 11 in the envelope 12. Additionally, each of the forward edges of the envelope 12 are rolled back, as at 16, to avoid rough edges. Stamped into the upper and lower sides of the envelope 12 are longitudinal ribs or embossments 17 which are effective both for keeping the rear side of the tray level with the front side, which would otherwise be elevated due to the folded edges 16, and also for rigidizing the tray.

The magazines 3 and 4 are opened at the bottoms thus to enable trays to be moved from the bottom of a stack in one magazine and to be added to the bottom of the stack in the other. To facilitate this operation a horizontal guideway generally designated 20 in FIGURES 1–3 is provided which interconnects the undersides of the magazines 3 and 4.

The guideway 20 is adapted for movement therethrough of tray advancing fingers 21. The fingers 21 are suitably mounted on a circuitous chain 22 carried on a pair of horizontally spaced sprockets 23 which are suitably rotatably mounted on the frame 1 each at an outer end of one of the magazines 3 and 4.

In the arrangement described to this point the chain 22, when actuated counter-clockwise in FIGURE 1, is effective for causing one of the fingers 21 thereon to engage the outer end of the lowest tray 10 of the stack in magazine 3 and advance it in the guideway 20 toward the left in FIGURE 1 or toward the underside of the magazine 4.

Disposed at the front of the apparatus as viewed in FIGURE 1 and in a region corresponding to the space between the magazines 3 and 4 is an air valve 25. As perhaps better seen in FIGURES 2 and 3, the air valve 25 is reciprocable and includes an orifice 26 which, when the valve is reciprocated forwardly and thus moved to the dot and dash position of FIGURE 3, is brought into close registry with an aperture 14 in the rear side of a cell 13 of a tray positioned in the guideway 20 before the valve 25. The valve 25 is supplied with a continuously flowing fluid, such as air, through a tube 27 from a source not shown. The reciprocation of the valve 25 is effected by means of an air clamp arrangement which is generally designated 28 in FIGURE 2 and is suitably mounted by means of a bracket 29 to the magazines 3 and 4.

The manner in which the air clamp 28 is energized cyclically for reciprocating the valve 25 in timed relation with the positioning of a tray cell at the ejection or operating station will be brought out in detail hereinafter.

It will be seen from the foregoing that in order to present the individual tray cells at the ejection station so as to register the aperture 14 at each cell with the orifice 26 of the valve 25 when the latter is reciprocated to the operating position shown in dot and dash lines, it is necessary to actuate the chain drive 22 so as to actuate each tray for indexing each cell thereof at the ejection station. Additionally, it is necessary to provide means for effecting a long indexing movement between trays to correspond to the longer spacing that exists between the center lines of the last cell in one tray to the center line of the first cell in the next tray, since spacing is greater than the normal spacing between successive cells of a single tray.

In order to accomplish these various indexing movements we have provided an arrangement including a ratchet wheel 30 which is fixed to rotate with the sprocket meshing with one end of the chain 22. The ratchet wheel 30 includes a plurality of outer teeth 31 having a pitch correlated to the pitch or spacing between the center lines of the adjacent cells of each tray. Cooperating with the teeth 31 is a pawl 32. The pawl 32 includes one end which engages the teeth 31 and an opposite end which is rotatably mounted on an eccentric crank 33 carried by a shaft 34 rotatably mounted in a suitable bracket 35 supported by one of the standards 2 of the frame 1. At the end of the shaft 34 opposite the crank 33 is carried a pulley wheel 36. A suitable pulley belt 37 provides connection between a pulley 36 and a drive pulley 38 which, in turn, is suitably driven by an electric motor generally designated 39 and supported by a platform 40 securely mounted between the standards 2. Thus, when the motor 39 is energized, the eccentric crank 33 provides reciprocating movement to the pawl 32 which, in turn, cooperates with the ratchet wheel 31 to cause actuation of the drive chain 22 in line increment corresponding to the spacing between the center lines of adjacent cells in a single tray.

By means of the fingers 21 this movement is transmitted to the lower most tray in the magazine 3 and thus causes each cell to be indexed for registration of the aperture 14 thereof with the orifice 26 of the air valve 25 at the ejection station between the magazines.

Provided for causing energization of the air clamp 28 thereby to move the valve 25 into the ejecting position illustrated in dot and dash lines in FIGURE 3 is a micro-switch generally designated 41 in FIGURES 1 and 2. The micro-switch 41 includes a roller contact element 42 which cooperates with and is actuated cyclically by the eccentric 33 on the motor driven shaft 34. Thus, the switch 41 is closed cyclically in coordination with the movement of each cell 13 into registering relation with the orifice 26 of the air valve 25. When this registration is effected and the air valve is moved forward to its ejecting position the air emanating from the orifice 26 constitutes a blast which flows through the aperture 14 in the cell at the ejecting position whereby an article, such as a grid designated G in FIGURE 3, is ejected out of the tray and into receiving means 44 suitably mounted on the side of the apparatus opposite the air valve. The receiving means 44 can include a tubular transport tube or chute 45 for transporting and directing the grids to a predetermined location such, for example, as a tube assemblying position (not shown).

The means provided for effecting the above-discussed long index movement between trays constitutes a single ratchet tooth 50. Provided for cooperating with the single ratchet tooth 50 is one end of a pawl 52 which is rotatably mounted on the eccentric crank 33. The relationship of the teeth 31 on the ratchet 30 and the single tooth 50 on the wheel 51 is such that one complete revolution of the wheel 30 will cause indexing of each cell 13 of a single tray 10 at the eject position and once during that complete revolution the ratchet pawl 52 will fall into the tooth 50 for providing a single long actuation effective for insuring proper indexing movement of the first cell of a subsequently actuated tray 10. Following a complete revolution of the ratchet wheel 30 with the corresponding complete actuation of a tray from the underside of the magazine 3 to the underside of the magazine 4, it is necessary to add the completely indexed tray to the underside of the stack of empty trays in the magazine 4. Additionally, it is necessary to elevate the stack to a position wherein it will not be obstructive to the lateral movement of a succeeding tray in the guideway 20. Provided for accomplishing this is a stack elevator generally designated 55 in FIGURES 1, 2, and 5. The elevator 55 comprises an air cylinder 56 suitably mounted vertically on a support 57 secured to one of the standards 2. The air cylinder 56 includes a piston rod 58 which extends vertically to a normal position just under the portion of the guideway 20 beneath the magazine 4. Secured to the piston rod 58 is an arm 58a which carries a vertical rod 58b which is slidably guided at its upper end and also extends to a normal position just under the magazine 4. The piston is biased to this normal position by a coil spring 59 disposed between the arm 58a and a portion 61 of the framework beneath the guideway 20.

Figure 5:
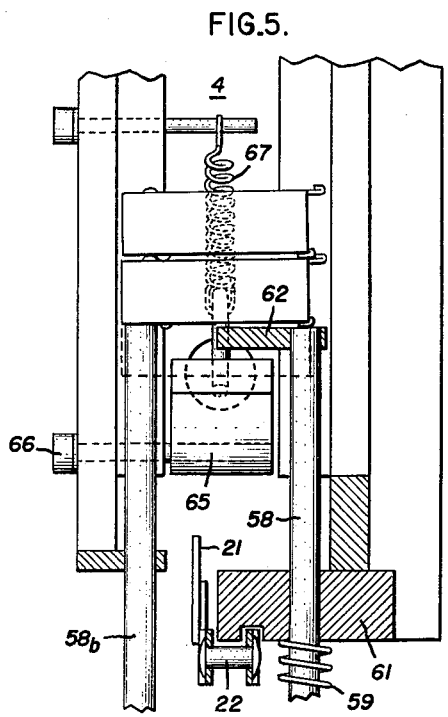
FIGURE 5 is an enlarged fragmentary view illustrating in detail the features of the tray elevator.

As best seen in FIGURE 5 the upper extremity of the rod 58 has secured thereto a horizontally extending finger 62 which extends beneath the guideway 20 approximately in the mid-portion of the magazine 4. The finger 62 is adapted for engaging the underside of a tray which has been actuated to a position in the guideway 20 beneath the magazine 4. Thus, it will be seen that when a tray is positioned beneath the magazine 4 and the piston rod 58 is actuated vertically upwardly the finger 62 will be effective for elevating the tray upwardly into the magazine 4. In order to retain the thus elevated trays in the magazine 4 we have provided a pair of cam detents 65. The detents 65 comprise bell-crank-like elements which are each pivotally mounted at one end of the frame of the magazine 4 between the front and rear walls thereof as at 66. Opposite the pivots 66 the detents 65 are connected by suitable springs 67 to the walls of the magazine 4. Thus, as each tray 10 is elevated in the magazine 4 it effectively cams the detents 65 outwardly from the positions of FIGURE 1 until the lowermost tray in the magazine 4 is sufficiently elevated to enable the detents 65 to return to the positions thereof illustrated in FIGURE 1 in which positions the detents 65 are effective for maintaining the stack of trays in the elevated position illustrated.

Provided for timing the just-described operation of the tray elevator with the positioning of a tray in the guideway 20 beneath the magazine 4 is a micro-switch 70. The micro-switch 70 includes a contact element 71 adapted for being actuated for closing the switch 70 by a stud 72 fixedly mounted on the ratchet wheel 30. Thus, for each rotation of the ratchet wheel 30 the stud 72 will actuate the contact 71 for closing the switch 70. With the switch 70 thus closed, an electric circuit is completed through a solenoid control valve 73 which controls the admission of compressed air into the air valve 56 from a suitable source. With the air valve 56 thus supplied with the compressed air, the piston thereof is actuated upwardly for moving the rods 58 and 58b upwardly which, in turn, effects the above-described tray elevating operation. When the micro-switch 70 is again opened by movement of the stud 71 past its effective switch-closing position, the solenoid controlled air valve 73 is closed and the spring 59 is effective for returning the pushrods 58 and 58b downwardly to normal ineffective positions, thus to await the subsequent positioning of a succeeding tray beneath the magazine 4.

Figure 6:
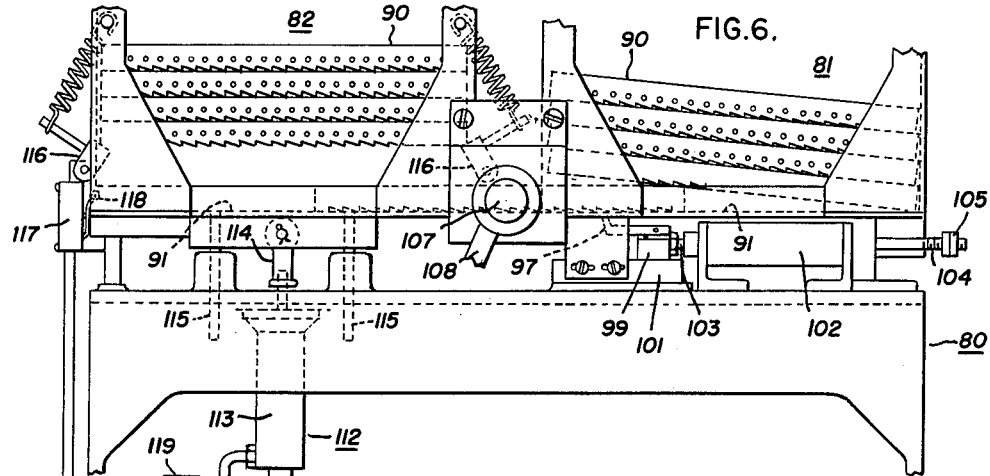
FIGURE 6 is an elevational view of a modified form of article handling apparatus constructed in accordance with our invention.
Figure 8:
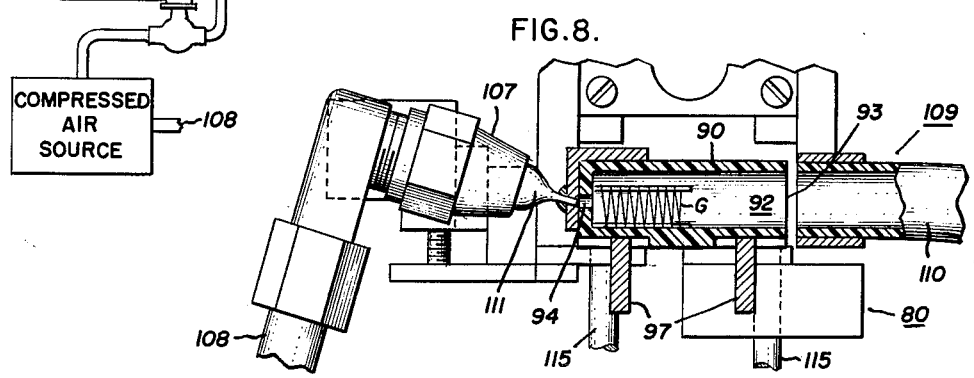
FIGURE 8 is an enlarged fragmentary sectional view of the air valve of the structure of FIGURE 6.
Figure 7:
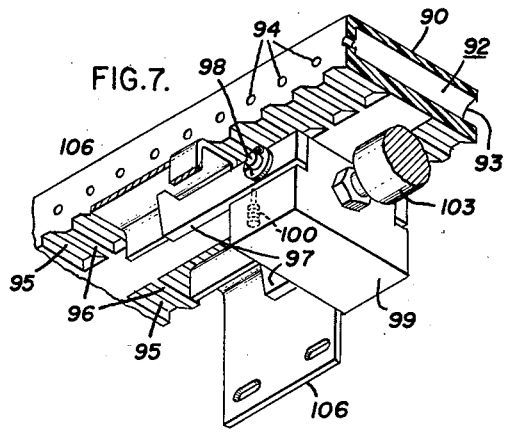
FIGURE 7 is an enlarged detailed perspective view of the tray actuating means of the modified form of apparatus.

Illustrated in FIGURES 6–8 is a modified form of our invention including a frame generally designated 80. This frame also is preferably tilted approximately 10° from the vertical for the same purpose described above with respect to the embodiment of FIGURES 1–5. The frame 80 supports a pair of magazines generally designated 81 and 82 which, like the magazines in the first-described embodiment, are in side-by-side relation with a space interposed and are each constructed to receive a vertical stack of trays, generally designated 90.

The magazines 81 and 82 are open at the bottoms to enable trays to be removed from the bottom of a stack in one magazine and to be added to the bottom of the stack in the other. A horizontal guideway 91 interconnects the undersides of the magazines 81 and 82 and facilitates and guides the movement of trays between magazines.

As best seen in FIGURE 7, the trays 90 each preferably comprise a moulded plastic construction or the like, including a plurality of horizontally arrayed individual cells 92. The cells 92 are fully open at one end, as at 93, to enable free passage of grids or like articles into and out of the cells. The opposite ends of the cells are opened only by virtue of small apertures 94 formed in the corresponding walls of the trays. The undersides of the trays have moulded thereinto a pair of ratchet bars 95 including ratchet teeth 96 corresponding in spacing to the center-to-center distance between adjacent cells 92.

Provided for cooperating with the teeth 96 to actuate the trays laterally in the guideway 91 is a pair of pawls 97. The pawls 97 are pivotally mounted at 98 on a slidable block 99 and spring-loaded means 100 carried in the block are effective for biasing the pawls upwardly for cooperative engagement with the teeth 95 on the undersides of the trays.

The block 99 is arranged for sliding movement on another block 101 suitably mounted on the frame 80. Provided for actuating the block 99 and, thus, determining the movement of the pawls 97, is an air cylinder 102 suitably mounted fixedly on the frame 80 beneath the magazine 81. The air cylinder 102 includes a forward piston rod 103 connected to the block 99 and a rear extension rod 104. The extension rod 104 includes a threaded end and an adjustment screw arrangement 105, whereby the throw or extent of movement of the pawls 97 may be adjustably determined.

By means not shown the cylinder 102 is connected to a compressed air source and adapted for being cyclically operated for moving the pawls 97 leftward in FIGURES 6 and 7. The pawls 97 are adapted when so moved to engage and ride each on a plate 106 mounted suitably on the frame 80 beneath the guideway 91 and, specifically, each beneath a ratchet bar region of a tray in the guideway. As the pawls move leftward they ride on the plates 106 until they reach the ends thereof, after which the pawls move beyond the ends of the plates, engage a tooth 96 of a tray 90 and advance the tray a distance corresponding to the spacing between cells 92.

On the return movement of the cylinder piston and pawls, the pawls engage the ends of the plates 106 and are thereby cammed out of engagement with the trays and readied for a succeeding tray advancing or indexing movement.

After each tray is fully advanced out of position beneath the magazine 81 the bottommost tray in the stack in the magazine 81 drops fully into the guideway 91 for being advanced in the manner just-described.

The tray-advancement above-described is effective for indexing the trays 90 in a manner to position the cells 92 of each tray seriatim at an operating station positioned in the space disposed between the magazines 81 and 82. At the operating station is located an air valve 107.

The air valve 107 is adapted for accomplishing the same general function as the air valve 25 of the first-described embodiment. That is, it is connected by a line 108 to the source of compressed air and is effective for directing a stream of air through the aperture 94 of a cell, and thus through the cell, positioned at the operating station, thereby to eject an article contained in the cell and to direct the article into receiving means 109 including transport means such as a tube 110.

The air valve 107 is different, however, in that it is not reciprocable and includes a nozzle 111 shaped to emit a horizontal flat thin stream of air and to direct same downwardly into the tray cells 92 through the apertures 94. Thus, a concentrated sheet-like stream of air is directed against the bottom sidewalls of the cells. This manner of directing the article-ejecting stream of air into the cells provides for facilitated ejection of articles such as grids of the type illustrated which, by virtue of their construction, offer relatively little resistance to air flow directed through the centers thereof. By directing the air stream downwardly against the sidewalls of the cells more air is directed against the grid wires and is more effective for ejecting the grids. Additionally, however, air pressure may be used for ejection which minimizes the chances of damage to the grids during the ejection operation.

After each tray is fully indexed past the operating station it is necessary to cause its elevation into the stack contained in the magazine 82. This is accomplished by an elevator generally designated 112. As seen in FIGURES 6 and 8, the elevator 112 comprises an air cylinder 113 mounted suitably on the frame 80 centrally beneath the magazine 82. The air cylinder includes a vertically actuatable piston rod 114 to the upper end of which is connected a frame carrying four vertically guided rods 115. The rods 115 are effective when the piston rod 114 is actuated vertically for elevating a tray from the guideway 91 into the magazine 82.

Provided on either side of the magazine 82 is a cam detent 116 which is identical in construction and operation to the cam detents 65 on the above-described first embodiment. The operation of the elevator air cylinder 113, and therefore of the elevator, is controlled by a micro-switch 117 which is mounted on the frame 80 at the end of the guideway 91. The micro-switch 117 includes a contact arm 118 which is engaged by the end of a tray 90 when the latter is directly positioned beneath the magazine 82. This engagement closes the micro-switch 117 for energizing a solenoid valve 119, thereby to admit compressed air from the source thereof into the cylinder 113 for actuating the piston rod 114 upwardly to elevate the tray which closed the micro-switch 117. When the tray is thus elevated, the micro-switch is opened and the elevator descends.

Figure 9:
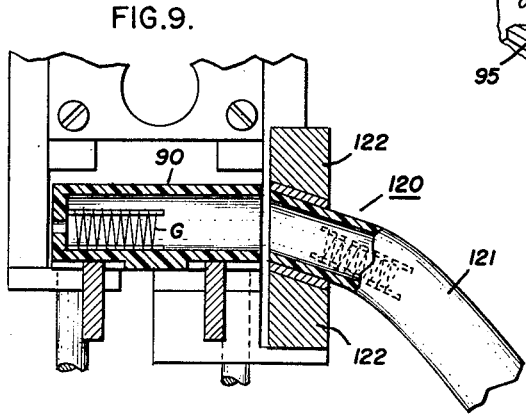
FIGURE 9 is an enlarged fragmentary sectional view of another modified form of our apparatus.

Illustrated in FIGURE 9 is a modified form of our invention wherein magnetic means is provided at the operating station for removing articles from a tray and directing same into transport means. In this embodiment, the construction of the apparatus can be the same as either of the above-described other embodiments except for the article removing means at the operating station between the magazines. In the present embodiment, article receiving means generally designated 120 and including a transport tube or chute 121 is mounted at the side of the apparatus facing the fully open sides of the trays. Also positioned in the region is magnetic means which can comprise a pair of permanent magnet pole pieces 122 disposed on either side of the receiving means 120. Thus, as each cell is indexed to the operating station, and providing the article held thereby is of magnetic material, the magnets 122 will effectively remove the article from the cell and transfer same into the transport means.

It will be seen from the foregoing that alternatively electromagnetic means can be utilized in place of the permanent magnets 122.

It will be seen still further that the apparatus of the various figures is also suitable for use in filling trays with articles. That is, in each of the various described forms of apparatus the air valves can be disconnected from the compressed air source and connected to a vacuum source and articles can be fed seriatim to the operating station through the transport means. In this form of apparatus the vacuum would serve to draw the articles into cells positioned seriatim at the operating station. Alternatively, the articles can be fed through the transport means either gravitationally or under he influence of compressed air. Where compressed air is used it will, for some purposes, not be necessary to connect the air valves to a vacuum source.

While we have shown and described a specific embodiment of our invention we do not desire our invention to be limited to the particular form shown and described, and we intend by the appended claims to cover all modifications within the scope of our invention.

What we claim as new and desire to secure by Letters Patent of the United States is:

1. Article handling apparatus comprising, a frame, a magazine containing a stacked plurality of containers, each container including a plurality of individual cells fully open at one side and partially open at the other and adapted for holding articles to be handled, a tilted guideway in said frame constructed and arranged for having said containers slidably actuated therethrough with the fully open sides of said cells disposed slightly higher than the apertured sides, thereby gravitationally to retain articles in said cells, an operating station located along said guideway, container indexing means comprising ratchet means operative for moving said containers along said guideway in increments related to the spacing of adjacent ones of said cells, thereby to position said cells seriatim at said operating station and ejection means at said operating station including a nozzle providing an air blast registrable with the partially open side of each cell, seriatim, and means controlled by said indexing means for automatically actuating said ejection means upon arrival of a cell at a position such that its partially opened end registers with said nozzle.

2. Article handling apparatus comprising, a frame tilted from a vertical position, a magazine containing a stacked plurality of containers, said containers each including a plurality of horizontally aligned individual cells, fully open at one side and apertured at the other and adapted for holding articles to be handled, a guideway in said frame adapted for having said containers slidably actuated therethrough with the open sides of said cells disposed slightly higher than the apertured sides due to the tilt of such frame, thereby gravitationally to retain articles in said cells, operating station located along said guideway, and container indexing means comprising ratchet means operative for moving said containers in by increments related to the spacing between adjacent ones of said cells, thereby to position said cells of each container seriatim at said operating station, and said ratchet means being further operative for moving said containers in increments related to the differential spacing between the last and first cells of adjacent containers, thereby to assure proper positioning of the first cell of each container at said operating station.

3. Article handling apparatus comprising, a frame tilted from the vertical position, a spaced pair of magazines, a plurality of containers each including a plurality of individual cells fully open at one side and apertured at the other and adapted for holding articles to be handled, a guideway in said frame extending from beneath one magazine to the underside of the other and adapted for having said containers slidably actuated therethrough with the other open sides of said cells disposed slightly higher than the apertured sides due to the tilt of said frame, whereby gravitationally to retain articles in said cells, an operating station along said guideway between said magazines, container indexing means operative for actuating the lowermost container in one of said magazines toward the underside of the other of said magazines and positioning said cells seriatim at said operating station, an elevator operable beneath said other magazine and effective for actuating containers upwardly into said other magazines, and detent means operative for maintaining all containers in said other magazine elevated above said guideway, thereby to avoid obstruction to succeeding containers moving in said guide past said operating station.

4. Article handling apparatus comprising, a frame tilted from the vertical position, a movable container including a plurality of individual cells fully open at one side and apertured at the other and adapted for holding articles to be handled, a guideway in said frame adapted for having said containers slidably actuated therethrough with the open sides of said cells disposed slightly higher than the apertured sides due to the tilt of said frame, thereby gravitationally to retain articles in said cells, an operating station located along said guideway, container indexing means comprising a chain drive carrying a plurality of actuating elements adapted for engaging an end of said container, ratchet means operative for moving said chain drive by increments related to the spacing between adjacent ones of said cells, thereby to position said cells seriatim at said operating station, and reciprocable air valve at said operating station, and means for reciprocating said air valve as each cell is positioned at said station for registering the orifice of said valve with the aperture side of the cell at said station.

5. Article handling apparatus comprising, a frame supporting a spaced pair of magazines, a plurality of containers each including a plurality of individual cells having air passages therethrough and effective for holding articles to be handled, a guideway in said frame extending from beneath one magazine to the underside of the other and adapted for having said containers actuated therethrough, an operating station located along said guideway between said magazines, container indexing means comprising a chain drive carrying a plurality of predeterminately spaced actuating elements adapted for consecutively engaging the ends of the lowermost ones of said containers in said one of said magazines, ratchet means operative for moving said chain drive by increments related to the spacing between adjacent ones of the cells of a container, thereby to position said cells seriatim at said operating station and further operative for moving said chain drive in increments related to the differential spacing between the last and first cells of adjacent containers in said guideway, thereby to assure proper positioning of the first cell of each container at said operating station, an air valve at said operating station, means for moving said air valve into an operative position with respect to each cell of a container indexed into said operating station for directing a stream of air through said cells to eject articles therefrom, an elevator operable beneath the other of said magazines and effective for actuating empty containers into said other magazine, and detent means operable for maintaining all empty containers in said other magazine elevated above said guideway, thereby to avoid obstruction to other containers moving in said guideway past said operating station.

References Cited in the file of this patent

UNITED STATES PATENTS

| | | |
|---|---|---|
| 233,095 | Hill | Oct. 12, 1880 |
| 1,111,946 | Byrd | Sept. 29, 1914 |
| 1,165,700 | Muessel | Dec. 28, 1915 |
| 1,325,752 | Pope | Dec. 23, 1919 |
| 1,824,441 | Miller | Sept. 22, 1931 |
| 1,927,502 | Richardson | Sept. 19, 1933 |
| 2,028,410 | Repisarda | Jan. 21, 1936 |
| 2,371,675 | Cherry | Mar. 20, 1945 |
| 2,468,819 | Fry | May 3, 1949 |
| 2,479,534 | Bergh | Aug. 16, 1949 |
| 2,613,861 | Goerlitz | Oct. 14, 1952 |
| 2,737,314 | Anderson | Mar. 6, 1956 |
| 2,744,372 | Cleaveland et al. | May 8, 1956 |
| 2,829,477 | Folly | Apr. 8, 1958 |
| 2,834,510 | Cenotti | May 13, 1958 |
| 2,856,097 | McFaull | Oct. 14, 1958 |
| 2,904,215 | Kohler | Sept. 15, 1959 |
| 2,946,480 | Farber | July 26, 1960 |